United States Patent
Langiano et al.

(10) Patent No.: US 6,364,234 B1
(45) Date of Patent: Apr. 2, 2002

(54) TAPE LOOP/SLACK PREVENTION METHOD AND APPARATUS FOR TAPE DRIVE

(76) Inventors: Michael Donald Langiano, 608 Ramona Ct., Berthoud, CO (US) 80513; Christopher J. Turner, 6176 Misty Way, Longmont, CO (US) 80503

(*) Notice: Subject to any disclaimer, the term of this patent is extended or adjusted under 35 U.S.C. 154(b) by 0 days.

(21) Appl. No.: 09/522,531

(22) Filed: Mar. 10, 2000

(51) Int. Cl.[7] ................................ G11B 15/46
(52) U.S. Cl. .................... 242/334.3; 360/73.01
(58) Field of Search .............. 242/334.3, 334.4; 360/73.01

(56) References Cited

U.S. PATENT DOCUMENTS

| | | |
|---|---|---|
| 3,821,710 A | 6/1974 | Arciprete et al. |
| 3,962,727 A | 6/1976 | Kamimura et al. |
| 4,011,587 A | 3/1977 | Arter et al. |
| 4,099,211 A | 7/1978 | Hathaway |
| 4,106,065 A | 8/1978 | Ravizza |
| 4,125,881 A | 11/1978 | Eige et al. |
| 4,172,265 A | 10/1979 | Sakamoto et al. |
| 4,175,267 A | 11/1979 | Tachi |
| 4,215,377 A | 7/1980 | Norris |
| 4,257,075 A | 3/1981 | Wysocki et al. |
| 4,293,879 A | 10/1981 | Heitmann et al. |
| 4,357,639 A | 11/1982 | Hama et al. |
| 4,390,915 A | 6/1983 | Matsuyama |
| 4,394,694 A | 7/1983 | Ninomiya et al. |
| 4,404,605 A | 9/1983 | Sakamoto |
| 4,412,260 A | 10/1983 | Stricklin et al. |
| 4,420,778 A | 12/1983 | Sakamoto |
| 4,467,373 A | 8/1984 | Taylor et al. |
| 4,484,236 A | 11/1984 | Wilkinson |
| 4,486,796 A | 12/1984 | Sakamoto |
| 4,491,886 A | 1/1985 | Saito et al. |
| 4,492,991 A | 1/1985 | Osada et al. |
| 4,544,967 A | 10/1985 | Louth |

(List continued on next page.)

OTHER PUBLICATIONS

Pizzi, New Audio Recording Formats, Broadcast Engineering, Feb. 1993, paragraph. 60–63.

Sasake, T., Asltad, J., Younker, M., The NT Digital Mcro Tape Recorder, Goddard Conference on Mass Storage Systems and Technologies, Sep. 22–24, 1992, paragraph. 143–157.

Primary Examiner—John Q. Nguyen

(57) ABSTRACT

A capstan controlled tape transport mechanism that includes a tape tension controller for preventing tape slack in the tape path is presented. The transport mechanism includes a capstan, a spinnable reel, and a reel motor which controls the speed of revolution of the reel in response to a reel motor voltage/current. The spinning of the reel results in the winding of the tape around the reel to generate a tape stack whose radius varies according to the amount of tape wound around the reel hub. Each revolution of the reel generates a fixed number of reel tach pulses per reel revolution. The spinnable capstan controls the transport of tape across the capstan in the direction of the reel, generating a fixed number of capstan tach pulses per capstan revolution. The tape tension controller calculates a target count representing the expected number of capstan tach pulses per reel tach pulse based on the current tape stack radius, and monitors the received number of capstan tachs per received reel tach at the current tape stack radius. If the received number of capstan tachs exceeds the target count, the tape tension controller increases the reel motor voltage/current to cause the reel to spin faster to take up any existing slack in the tape path. Once the tape tension controller starts to receive reel tach within the target number of capstan tachs for the given tape stack radius, any existing adjustment voltage is ramped back down to the nominal reel motor voltage/current.

19 Claims, 6 Drawing Sheets

U.S. PATENT DOCUMENTS

| | | | |
|---|---|---|---|
| 4,554,598 A | 11/1985 | Tarbox et al. | |
| 4,581,662 A | 4/1986 | Sato | |
| 4,609,947 A | 9/1986 | Yamagiwa et al. | |
| 4,614,991 A | 9/1986 | Murakami | |
| 4,620,245 A | 10/1986 | Shimizu | |
| 4,628,372 A | 12/1986 | Morisawa | |
| 4,628,383 A | 12/1986 | Miyamoto | |
| 4,636,873 A | 1/1987 | Eguchi | |
| 4,637,023 A | 1/1987 | Lounsbury et al. | |
| 4,641,210 A | 2/1987 | Ohyama | |
| 4,642,714 A | 2/1987 | Miyamoto | |
| 4,644,414 A | 2/1987 | Yamada et al. | |
| 4,651,239 A | 3/1987 | Omori et al. | |
| 4,654,731 A | 3/1987 | Froschl et al. | |
| 4,663,673 A | 5/1987 | Doutsubo | |
| 4,665,447 A | 5/1987 | Odaka | |
| 4,677,504 A | 6/1987 | Yamazaki et al. | |
| 4,680,654 A | 7/1987 | Shibuya | |
| 4,682,247 A | 7/1987 | Doutsbo | |
| 4,688,109 A | 8/1987 | Sangu | |
| 4,703,373 A | 10/1987 | Oosaka | |
| 4,714,971 A | 12/1987 | Sigiki et al. | |
| 4,717,974 A | 1/1988 | Baumeister | |
| 4,731,678 A | 3/1988 | Takeuchi | |
| 4,737,865 A | 4/1988 | Murakami et al. | |
| 4,739,420 A | 4/1988 | Odaka et al. | |
| 4,758,904 A | 7/1988 | Takashashi et al. | |
| 4,758,911 A | 7/1988 | Nakano et al. | |
| 4,760,474 A | 7/1988 | Takimoto | |
| 4,769,811 A | 9/1988 | Eckberg, Jr. et al. | |
| 4,774,605 A | 9/1988 | Kato | |
| 4,786,011 A | 11/1988 | Fujiwara et al. | |
| 4,796,115 A | 1/1989 | Ohshima et al. | |
| 4,799,221 A | 1/1989 | Fukami et al. | |
| 4,802,172 A | 1/1989 | Fukami et al. | |
| 4,812,924 A | 3/1989 | Fukami et al. | |
| 4,821,129 A | 4/1989 | Culp | |
| 4,835,628 A | 5/1989 | Hinz et al. | |
| 4,843,495 A | 6/1989 | Georgis et al. | |
| 4,845,577 A | 7/1989 | Georgis et al. | |
| 4,897,739 A | 1/1990 | Hasegawa et al. | |
| 4,918,546 A | 4/1990 | Saito | |
| 4,930,027 A | 5/1990 | Steele et al. | |
| 4,933,784 A | 6/1990 | Oldershaw et al. | |
| 4,935,824 A | 6/1990 | Nakano et al. | |
| 4,935,827 A | 6/1990 | Oldershaw et al. | |
| 4,970,612 A | 11/1990 | Renders et al. | |
| 4,977,469 A | 12/1990 | Yokozawa | |
| 4,984,104 A | 1/1991 | Takahashi et al. | |
| 5,003,411 A | 3/1991 | Nagahara et al. | |
| 5,034,833 A | 7/1991 | Marlowe | |
| 5,050,018 A | 9/1991 | Georgis et al. | |
| 5,068,757 A | 11/1991 | Hughes et al. | |
| 5,103,355 A | 4/1992 | Steele | |
| 5,115,500 A | 5/1992 | Larsen | |
| 5,142,422 A | 8/1992 | Zook et al. | |
| 5,191,491 A | 3/1993 | Zweighaft | |
| 5,251,077 A | 10/1993 | Saitoh | |
| 5,262,905 A | 11/1993 | Takagi et al. | |
| 5,327,305 A | 7/1994 | Thomas | |
| 5,349,481 A | 9/1994 | Kauffman et al. | |
| 5,414,570 A | 5/1995 | Fry et al. | |
| 5,535,068 A | 7/1996 | Hughes | |
| 5,602,694 A | 2/1997 | Miles et al. | |
| 5,633,764 A | 5/1997 | Ohta | |
| 5,781,688 A | 7/1998 | Seong | |
| 5,872,997 A | 2/1999 | Golson | |
| 5,953,177 A | 9/1999 | Hughes | |

TAPE LOOP/SLACK PREVENTION METHOD AND APPARATUS FOR TAPE DRIVE

FIELD OF THE INVENTION

The present invention pertains generally to magnetic tape drives, and more particularly to a method and apparatus for preventing tape slack between the capstan and takeup reel in a tape drive by adaptively controlling the tape tension between the capstan and takeup reel.

BACKGROUND OF THE INVENTION

Tape storage technology is routinely used for routine system back up and long-term data archiving. Conventional tape storage devices rely on some form of tape motion control to transport the tape across a magnetic head as it moves between the supply reel and take-up reel of the tape drive.

The most common form of tape motion control is accomplished via a capstan assembly. In this type of system, the tape is pinched between a rotating capstan and a pinch roller during normal read/write operation. The force of the pinch roller against the portion of the tape contacting the capstan causes enough frictional force to move the tape as the capstan rotates. During a normal read/write operation, a takeup reel motor is also engaged to rotate the takeup reel in a direction to receive the tape passing across the capstan from the supply reel. The tension of the tape in the tape path between the capstan and takeup reel is affected by the rotational speed of the capstan in relation to the rotational speed of the takeup reel.

Tape tension control is achieved by monitoring both capstan tachometers and reel tachometers. Reel tachometers provide speed feedback information for each reel, which is used by the tape drive controller to control the reel speed. Reel motor voltage/current measurements are monitored by the controller and used to control the reel motor voltage/current in order to control the tape tension between the capstan and takeup reel during forward movement of the tape and between the capstan and supply reel during backward movement of the tape. The capstan tachometer provides speed information about the capstan. It is used by tape controller to verify proper direction and speed control of the capstan motor.

The tape tension between the capstan and reels can be derived with knowledge of the relationship between the amount of tape on each of the supply and takeup reels. Because the amount of tape on each of the supply and takeup reels continuously changes as the tape moves from one reel to the other, the radius of the amount of tape on the supply and takeup reels must be continuously calculated. The radii calculations are based upon the capstan and reel tachs. Because the relationship between a given reel tach and the position of the tape is not linear (due to the non-linear relationship between the radius of tape on a reel and the linear position of the tape), the reel radii calculations are also nonlinear. This calculation is typically handled by reel tension control circuitry. During manufacturing, the values of the reel motor voltage/currents for the calibrated tensions are set, typically by storing them in non-volatile storage. When the drive is running, the reel tension control circuitry outputs a voltage control signal to the reel motors. The voltage control signal changes based upon the radii and the measured amplifier voltage.

Tape slack can occur for a variety of reasons. Generally, the reel motor voltage/current is calibrated at the time of manufacture to a fixed voltage/current level. As the tape drive ages, the calibrated reel motor voltage/current value often becomes inadequate due to changes in tape binding, temperature, or friction.

Prior art methods of maintaining correct tension between the capstan and reels as the reel radii vary and as the drive temperature or power supply voltages fluctuate have required active tension sensors and dual reel motors or slip clutches in the supply and takeup hubs. Both techniques are costly in terms of occupying valuable circuit board space, and requiring additional components, additional circuit complexity, and additional drive assembly and test time. In addition, slip clutches tend to provide inconsistent tension from unit to unit and over the life of the tape drive.

Accordingly, a need exists for a more precise and less costly technique for controlling the tape tension between the capstan and tape reels. It would be desirable that this technique operated consistently from tape drive unit to tape drive unit and over temperature and voltage variations. Furthermore, it would be desirable to have such a technique without requiring additional components.

SUMMARY OF THE INVENTION

The present invention is a novel method and apparatus for precisely controlling the tape tension between the capstan and tape reels. In particular, the present invention allows tape tension control that is consistent from drive to drive and over varying temperature and manufacturing process variations. Furthermore, the present invention allows precise control without requiring additional components that add to cost, complexity, and test time.

In accordance with the invention, in a tape drive mechanism that actuates the reel hubs directly from a single reel motor via a gear train, the tension of the tape between the capstan and tape reels is adjusted by creating a phase locked loop (PLL) between the capstan tachometer pulses and the reel hub tachometer pulses. The amount of voltage applied to the reel motor is slaved to the capstan tachometer frequency. This allows the reel motor voltage/current to be adaptively adjusted to maintain proper tape tension between the capstan and tape reels. Because the efficient and novel tape tensioning technique of the invention requires fewer components than prior art solutions of the tape tensioning problem, the invention allows a lower cost tape drive that is more immune from the aging effects of the system components.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel method and apparatus for precisely controlling the tape tension between the capstan and tape reels is described in detail hereinafter.

Figure 1:
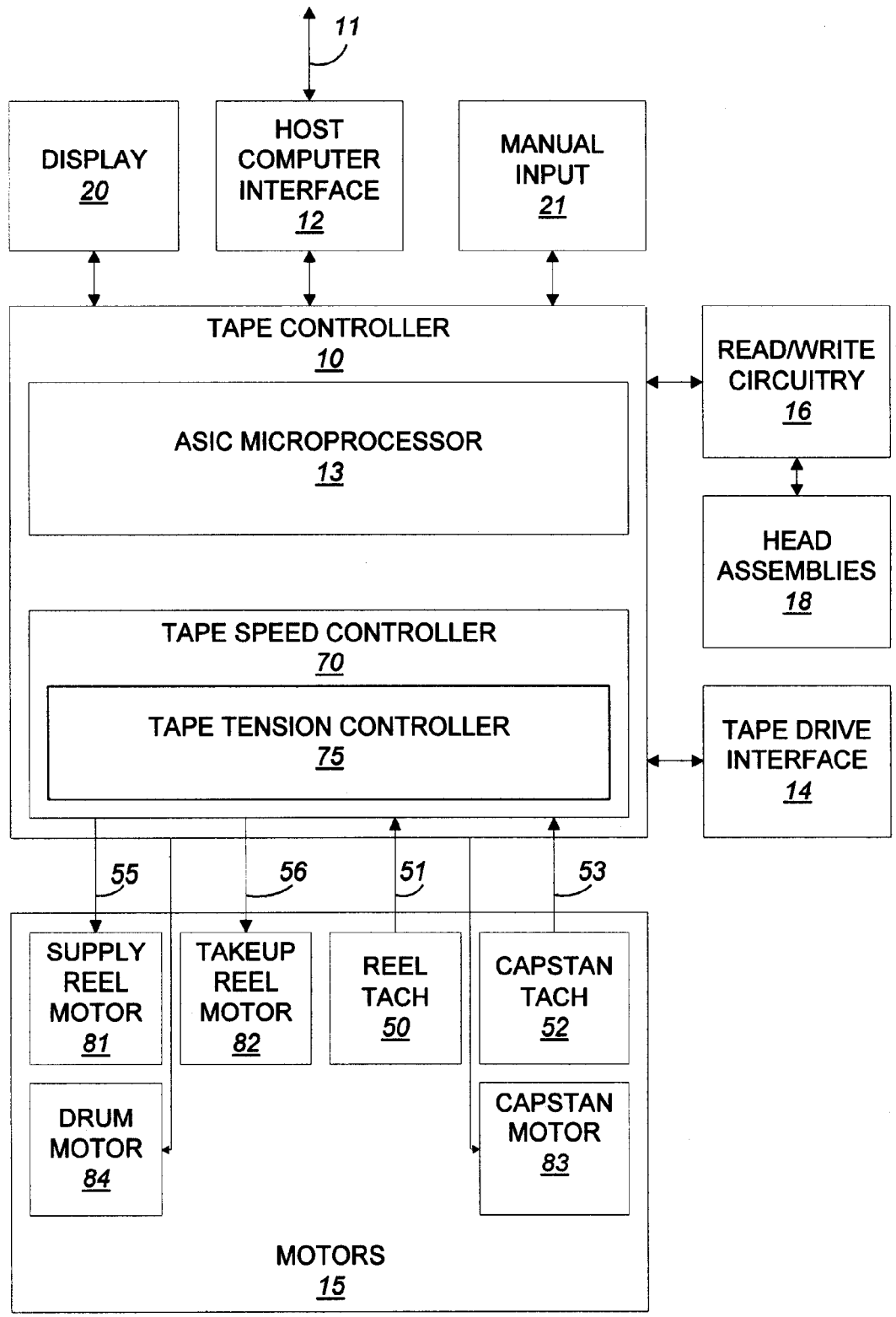
FIG. 1 is a block diagram of a tape drive in accordance with the invention.

FIG. 1 is a block diagram illustrating the functionality of a tape drive in accordance with the invention. Tape controller 10 manages a plurality of functionally separated blocks, including a host computer interface 12, a tape drive interface 14 which electromechanically cooperates with motors 15 for performing various drive functions, and read/write circuitry 16 which responds to commands from the controller 10 to perform reading and writing functions relative to the tape through head assemblies 18. Interaction with the user is through display 20 and manual input 21. Typically, tape controller 10 is an application specific integrated circuit (ASIC) that includes a microprocessor 13. Tape controller 10 interfaces with a host system via a host system interface 12, and with the tape drive via the tape drive interface 14. Controller 10 performs a variety of functions including among others speed and direction control of all motors, data formatting and unformatting, and generation and use of error correction. Read/write circuitry 16 manages the conversion of digital data from tape controller 10 into analog signals that are appropriate for the recording heads 18 and vice versa.

Motors 15 includes reel motors 81 and 82, capstan motor 83, and drum motor 84. Reel motors 81 and 82 drives the supply and take-up reels of the tape cartridge and can likewise drive the tape in either direction. Capstan motor 83 drives the capstan, which is responsible for regulating tape speed. The capstan motor 83 is bi-directional and can drive the tape in the forward or reverse direction. Drum motor 84 drives the rotating heads assembly 40 that scans the tape surface in a helical pattern.

The tape drive in the illustrative embodiment utilizes an 8 mm tape cartridge that has tracks recorded thereon in a helical scan pattern. It is, for example, intended to store 33 gigabytes of data with recovery speeds of up to 3 megabytes per second and a 5.25 inch form factor. It relies upon a variable speed architecture wherein servo controls are applied to tape speed and position during read operations. The variable speed architecture permits excellent performance under all conditions and reduces wear of heads, mechanisms, and media by eliminating reposition cycles characteristic of streaming tape drives. It is also relatively simple and low cost to design.

Figure 2:
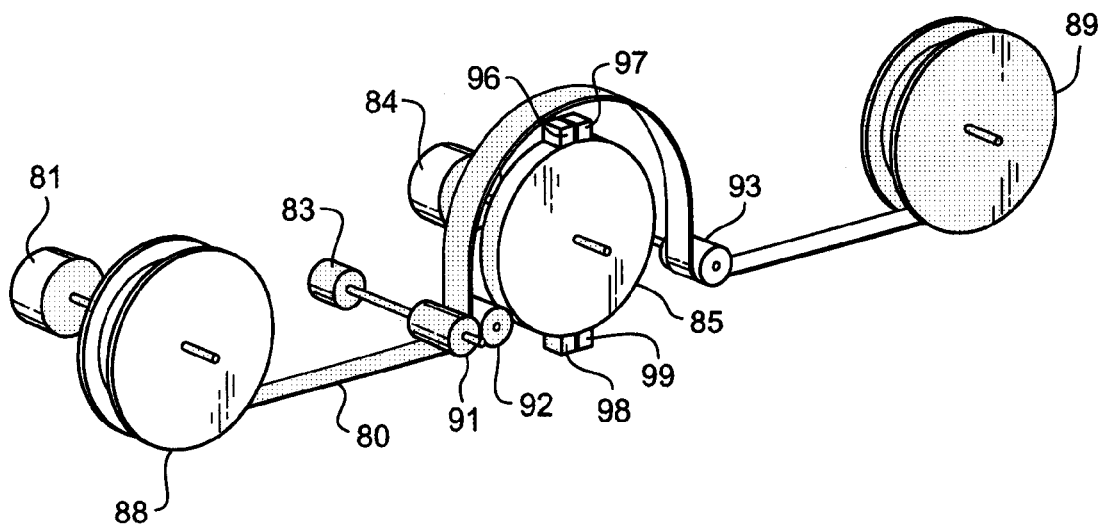
FIG. 2 is a top angular view of a tape path in one embodiment of the tape transport mechanism.
Figure 3:
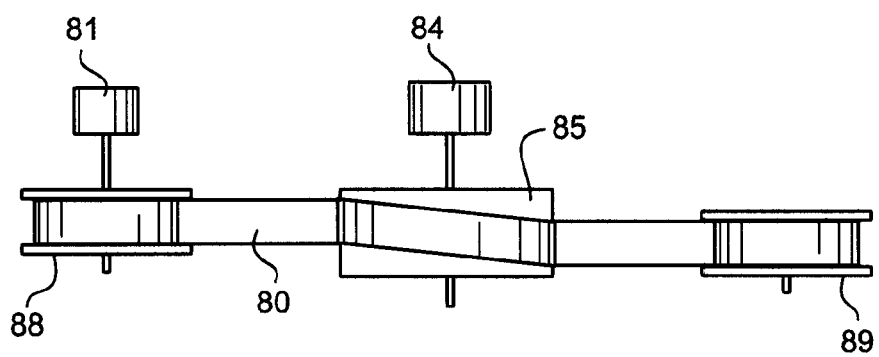
FIG. 3 is a side view of the tape transport mechanism of FIG. 2.
Figure 4:
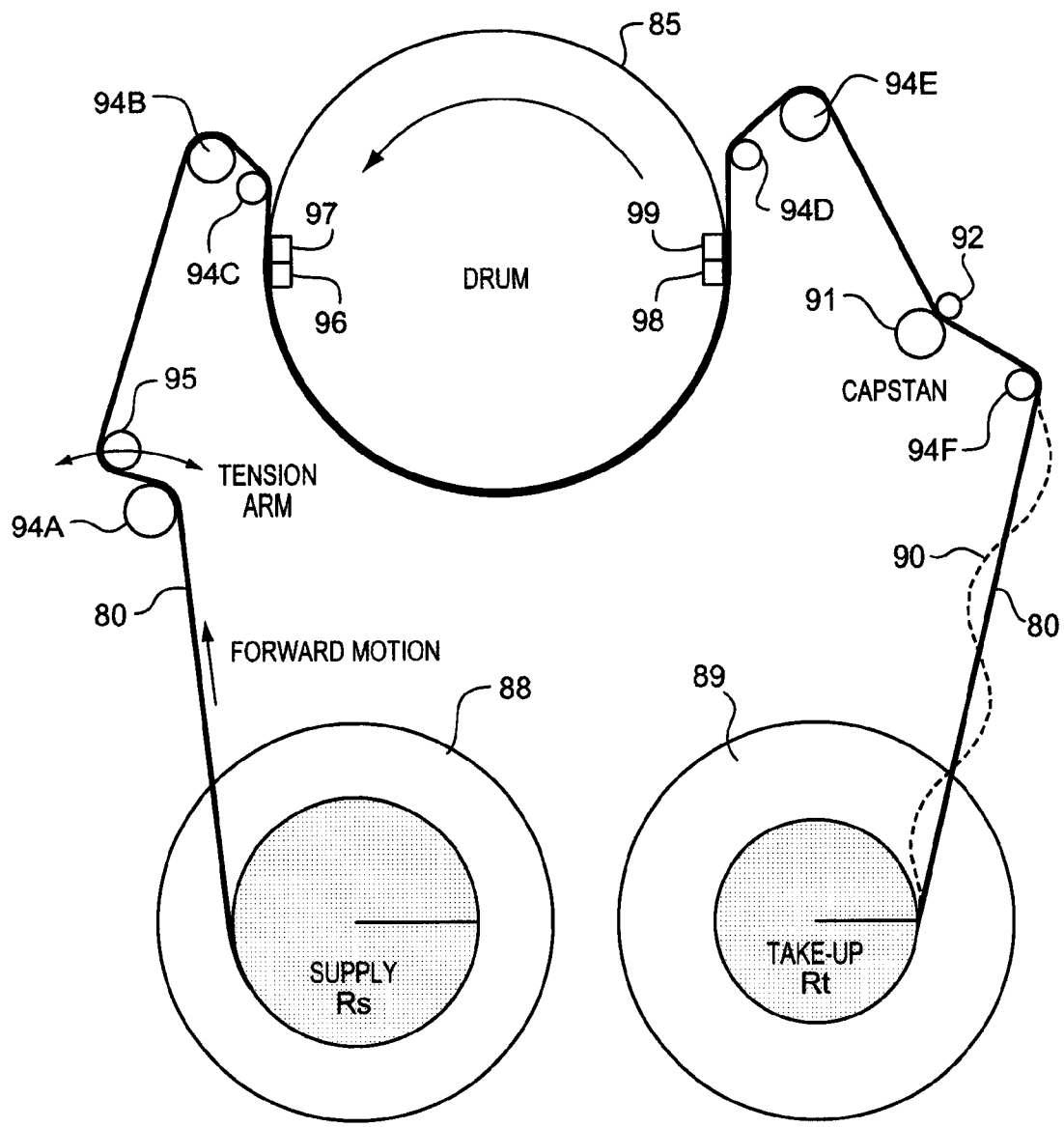
FIG. 4 is a top view of the tape transport mechanism of FIG. 2.

FIG. 2 is a top angular view and FIG. 3 is a side view of the tape path resulting from one arrangement of tape drive motors of a single reel motor tape drive. FIG. 4 is a top view of the tape drive configuration of FIGS. 2 and 3, illustrating the path followed by tape 80. As shown in FIGS. 2–4, motors including a single reel drive motor 81, capstan motor 83, drum motor 84, and drum 85. The single reel drive motor 81 can actuate either reel 88 or 89 through a clutch mechanism (not shown).

In the illustrative embodiment, data is written in tracks in an alternate azimuth, helical pattern by heads 96–99 on drum rotor 85 with an alternate azimuth technique. That is, a pair of alternate azimuth data tracks are recorded simultaneously at an angle across the tape by a pair alternate azimuth adjacent write heads. Tape speed controller 70 maintains the period of drum rotor 85 and speed of tape 80. Data is checked half a drum rotation after writing by a pair of alternate azimuth CAW heads located 180 degrees relative to the pair of write heads, and offending tracks re-written "on the fly" as required. Accordingly, for each rotation of drum rotor 85, two tracks are written and a write check of those two tracks is performed. Data is read with all four heads 96–99 using an alternate azimuth reading technique.

Drum 85 cooperates with capstan 91 and idler rollers 92 and 93 to retain the tape 80 in an arc of 196 degrees relative to the circumferential periphery of drum 85. Capstan 91 is operated by capstan motor 83 so as to modify the position of tape 80 relative to the path of head 96, 97, 98, 99 rotating on drum 85 to maximize the rate at which packets are read from tape 80. In other words, the relationship between tape position (or track position) and the path of the read/write heads is adjustable to alter the rate at which data is read from the tape. In the illustrative embodiment, data is read over a continuously variable transfer rate of up to a maximum of over 100% of the rate at which data is nominally recorded.

As shown in FIGS. 2–4, tape 80 circulates between supply reel 88 and take-up reel 89 after passing over a series of idler rollers 94a, 94b, 94c, 94d, 94e, and 94f, a biased tension arm and roller 95, and between capstan 91 and pinch roller 92. Drum 85 rotates so as to magnetically exchange data between heads 96–99 mounted thereon and tape 80 as it passes over the periphery of the drum 85.

Referring back to FIG. 1, reel tachometer 50 provides speed feedback information REEL_TACH 51 for each reel 88 and 89. This is used by tape speed controller 70 to control reel speed, discussed hereinafter. Capstan tachometer 52 can typically be a single-phase tachometer that provides speed information CAP_TACH 53 about the capstan. It is used by tape speed controller 70 to verify proper direction and speed control of the capstan motor 83.

The present invention is a tape tension controller 75 (see FIG. 1) which prevents the buildup of slack in the tape 80 between the capstan 91 and the supply and takeup reels 88 and 89. FIG. 4 illustrates forward motion of the tape 80 as it passes from the supply reel 88 to the takeup reel 89. Without the implementation of the tape tension controller 75 of the invention, described hereinafter, the tape is susceptible to the buildup of tape slack at point 90 during forward motion resulting from improper tape tension control. The tape tension controller 75 provides the tape drive with a measure of robustness and immunity from the tape going slack in the tape path.

In accordance with the invention, tape tension controller 75, preferably implemented within the tape speed controller 70, uses knowledge of the physical diameter (or radius $R_c$) of the tape drive capstan shaft 91, and the radius $R_T$ or $R_S$ of the tape pack 188 or 189 on the reel hub 88 or 89. The tape tension controller 75 constantly computes the ideal relationship between these two dimensions and produces a target count of "expected capstan tachometer pulses per reel tachometer pulse" at the current tape pack radius. Once this relationship has been computed, the tape tension controller 75 effectively implements a phased locked loop between the reel tach signal 51 and the capstan tach signal 53 to generate a reel voltage adjustment value that is added to the reel voltage 55 or 56.

Figure 5:
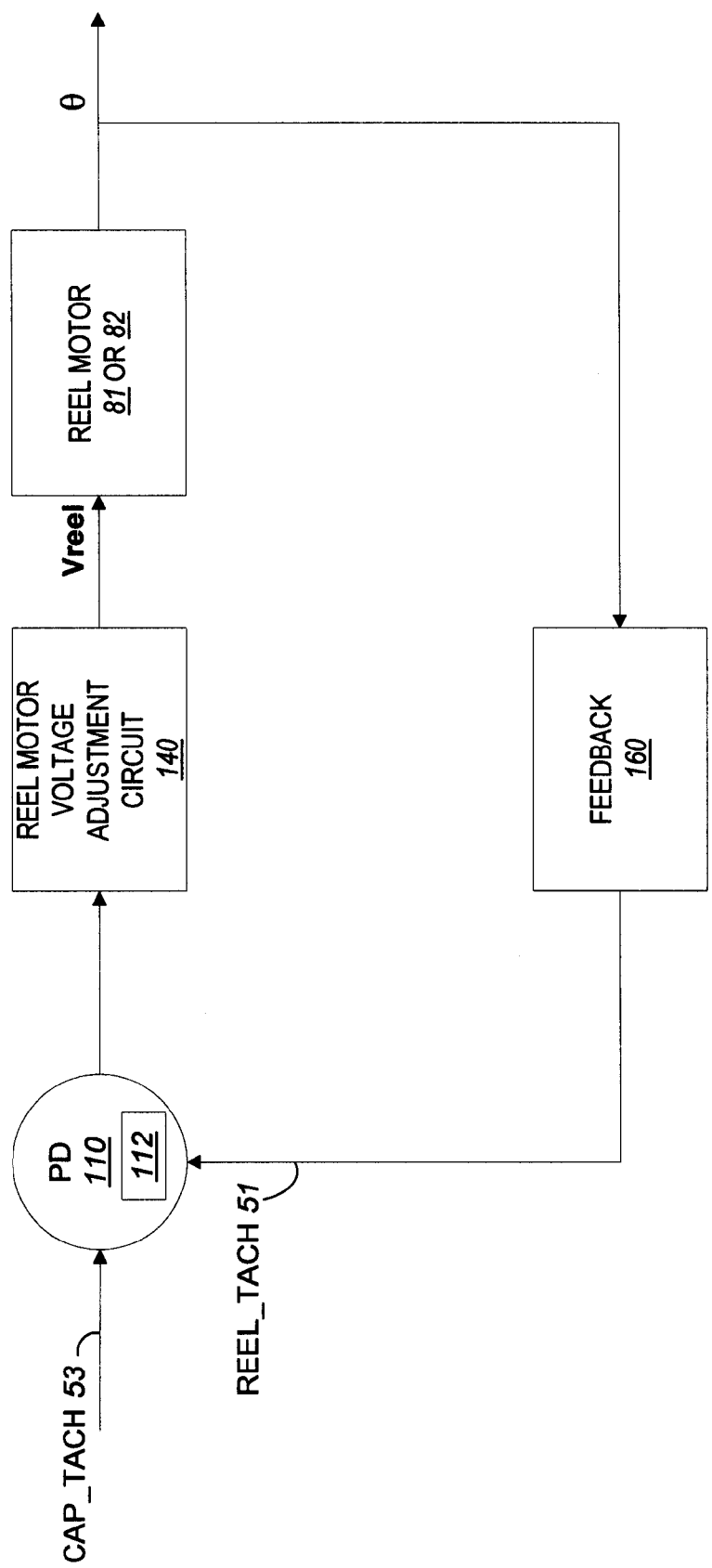
FIG. 5 is a block diagram of a tape tension controller in accordance with the invention.

FIG. 5 is a block diagram of the tape tension controller 75. As illustrated, tape tension controller 75 is essentially a phase-locked loop (PLL) which monitors the relationship between the reel and capstan tachs. As illustrated, the capstan tach CAP_TACH 53 operates as the reference frequency, the reel tach REEL_TACH 51 operates as the control frequency, and the output of the PLL is the adjusted reel motor speed θ. The tape tension controller PLL 75 includes a phase detector 110, adjustment circuit 140, motor 81 or 82, and a feedback circuit 160.

Phase detector 110 includes a target count calculator 112 which computes the expected number of capstan tachometer pulses per reel tachometer pulse based on the current reel tape radius $R_T$ or $R_S$. A fixed (albeit nonlinear) relationship exists between the number of capstan tachs and number of reel tachs per given tape stack radius on the reel hub when the tape is wound using the proper tape tension. This relationship is calculable based on the known fixed radius of the capstan 91 and the radius of the tape stack on the reel hub. This relationship allows the target count calculator 112 to generate the expected number of capstan tach CAP_TACH 53 pulses for each reel tach REEL_TACH 51 pulse. The radius of the capstan is much smaller than that of even an empty reel; accordingly, the capstan tach signal CAP_TACH 53 is of a higher frequency than the reel tach signal REEL_TACH 51. The reel tachs REEL_TACH 51 are generated at a constant linear rate independently of the radius of the tape stack. During normal read/write mode, the capstan speed is constant. The reel hub speed changes depending on the tape stack radius $R_T$. At any given time the ideal relationship between the number of capstan tach pulses per reel tach pulses can be calculated if the reel is spinning.

In the illustrative embodiment, target count calculator 112 employs the following derivation to determine the expected number of capstan tach pulses per reel tach pulse based on the current tape stack radius:

$$\text{Capstan Tach Pulses/Reel Tach Pulses} = (P_C/2*\pi*R_C)*(2*\pi*R_T/P_R),$$

where $P_C$ is the number of capstan tach pulses per capstan revolution, $R_C$ is the radius of the capstan shaft, $P_R$ is the number of reel tach pulses per reel revolution, and $R_T$ is the radius of the reel tape pack. The radius $R_C$ of the capstan shaft, number of capstan tach pulses per capstan revolution $P_C$, number of reel tach pulses per capstan revolution $P_R$, are fixed parameters for a given drive. Only the reel tape pack radius $R_T$ is variable. The tape tension controller 75 calculates the known relationship to generate a target count of expected capstan tach pulses per reel tach pulse for the current tape stack radius, resets a counter when a reel tach is encountered, counts and compares the number of capstan tachs received to the target count, and increases the current reel voltage if a reel tach pulse is not received within a predetermined error count of the target count. In other words, when the tape position is at a given reel tach, if the next reel tach is not seen when it is calculated to be seen, the capstan is moving tape in the direction of the reel faster than the reel is taking up the tape, thereby causing tape slack. The tape tension controller 75 detects this condition and intervenes by increasing the reel motor voltage/current to take up the tape faster to remove the tape slack. For every late reel tach, the reel motor voltage/current is ramped up to increase the reel motor speed to take up any slack; then, once the reel tachs are no longer late, the reel motor voltage/current is ramped back down to its calibrated value.

Figure 6:
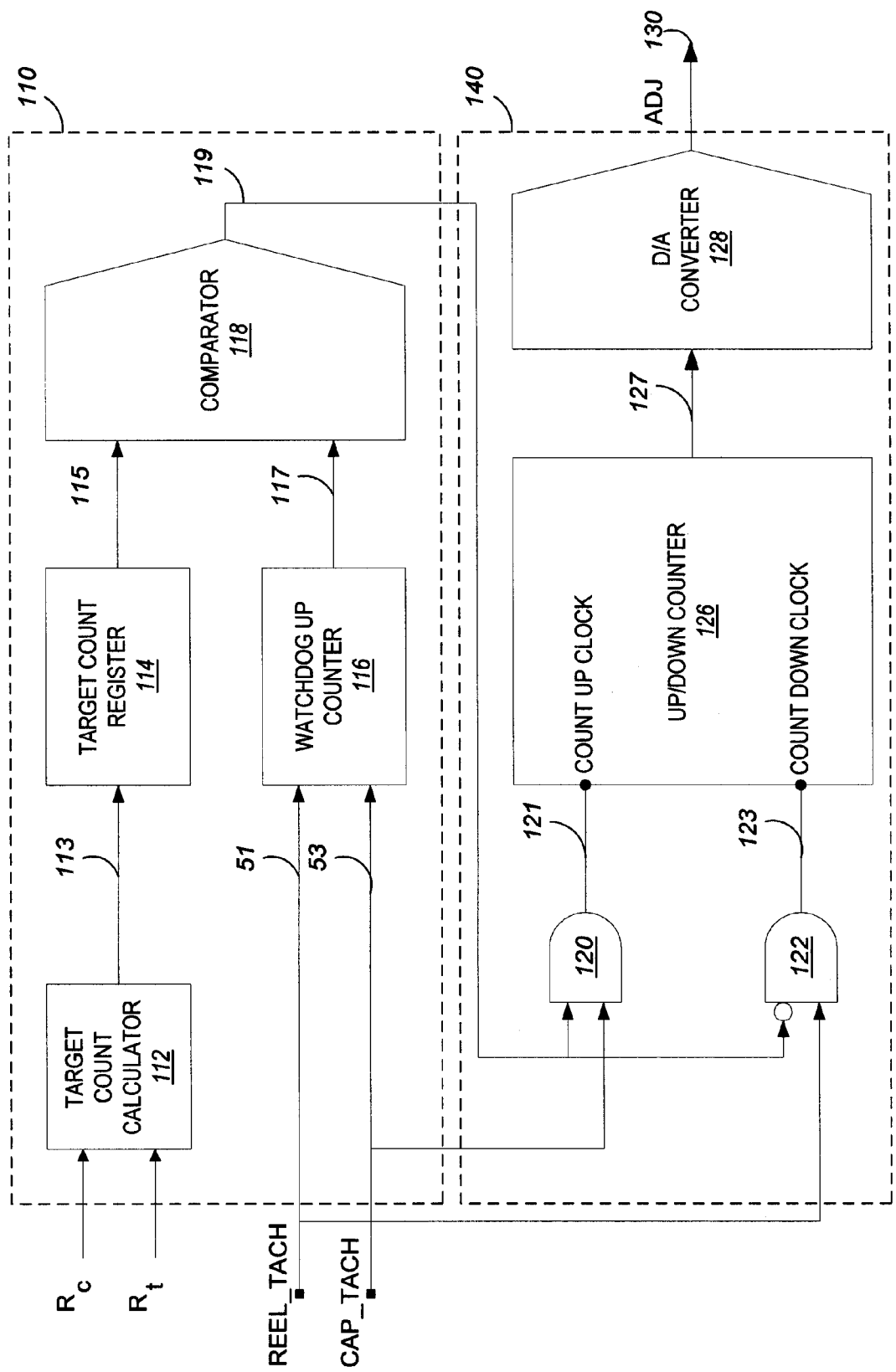
FIG. 6 is a block diagram of one preferred embodiment of a tape tension controller in accordance with the invention.

FIG. 6 is a block diagram of one preferred embodiment of tape tension controller 75. In this embodiment, phase detector 110 (FIG. 5) is formed with target count calculator 112, a "watchdog" up-counter 116, and a target count register 114 which stores the target count 113 of the expected capstan tachometer pulses per reel tachometer pulse as determined by a target count calculator 112. Watchdog up-counter 116 counts up one tick for each pulse of capstan tach CAP_TACH 53. Watchdog up-counter 116 is reset to zero any time it receives a pulse of reel tachometer REEL_TACH 51. A count comparator 118 detects if the watchdog up-counter 116 has received more capstan tach CAP_TACH 53 pulses (to cause its count to exceed the target value) without being reset by a reel tach REEL_TACH 51 pulse. This can only happen if the reel hub 88 or 89 is spinning at an angular velocity that is below its ideal rate. Should this occur, the count comparator 118 triggers via 119 the adjustment circuit 140 (FIG. 5) to generate an additional adjustment voltage ADJ 130 to be applied to the reel motor 81 or 82, thus increasing its angular velocity.

In the preferred illustrative embodiment, adjustment circuit 140 includes an adjustment voltage up/down counter 126 which generates an adjustment voltage count 127. Adjustment voltage count 127 is converted by digital-to-analog converter 128 to produce an analog reel motor adjustment voltage ADJ 130. Reel motor adjustment voltage ADJ 130 is added to the calibrated reel motor voltage VR and used to drive the reel motor. A logical AND gate 120 receives the count comparator trigger signal 119 and capstan tach pulse 53, and pulses the count up clock input of the adjustment voltage up/down counter 126 once for each capstan pulse that the reel tach is late. This allows the adjustment voltage up/down counter 126 to set the reel motor adjustment voltage to a value proportional to the lateness of the reel tach pulse (which is indicative of the amount of tape slack). Another AND gate 122 receives the inverted count comparator trigger signal 119 and reel tach pulse 51, and pulses the count down clock input of the adjustment voltage up/down counter 126 once for each reel pulse received on time. This allows the adjustment voltage up/down counter 126 to ramp down the reel motor adjustment voltage as the tape slack is taken up. The minimum value of the adjustment voltage is 0 V, to ensure that the reel motor voltage/current never drops below its calibrated value.

Figure 7:
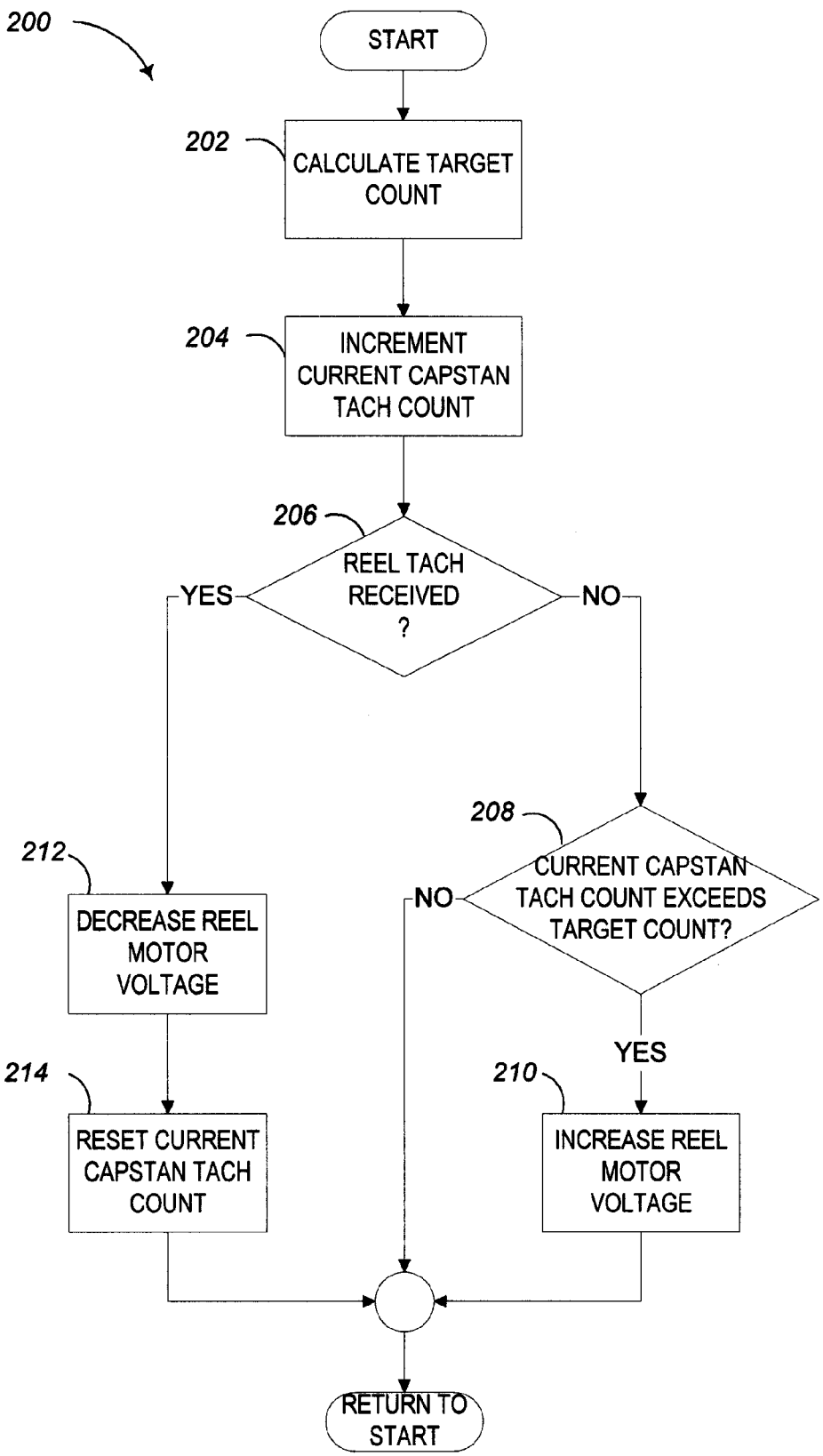
FIG. 7 is a flowchart of the operation of a tape tension controller in accordance with the invention.

FIG. 7 is an operational flowchart of the method of the invention. At the beginning of tape motion, the expected capstan tach pulses per reel tach pulse target count is calculated 202. A current capstan tach pulse count, initialized to zero, is maintained 204 by incrementing the count once each time a capstan tach pulse is received. In the embodiment of FIG. 6, this step is implemented by incrementing the watchdog up-counter 116. The reel tach signal is monitored 206. If a reel tach is not received, a comparison is made 208 between the target count and the current capstan pulse count. If the current capstan count exceeds the target count, the reel motor voltage/current is increased 210. In the embodiment of FIG. 6, this step is implemented by pulsing the count up clock input of the up/down counter 126. If the current capstan count does not exceed the target count 208, the method continues with step 202. If in step 206 a reel tach pulse is received, the reel motor voltage/current is decreased 212 (if nonzero) and the current capstan tach pulse count is reset 214 to zero. In the embodiment of FIG. 6, these steps are implemented by pulsing the count down clock input of the up/down counter 126 and resetting the watchdog up-counter 116. The method is then repeated beginning with step 202.

It will be appreciated from the above detailed description that the tape tension controller 75 operates to detect less-than-ideal tape hub take up rates and intercedes to fix the problem. This provides robustness to problems such as tape binding, mechanical system frictional increases with aging, and reel motor torque changes, among others.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for preventing tape slack in a capstan controlled tape transport mechanism, said tape transport mechanism comprising a spinnable reel onto which tape is wound to generate a tape stack whose radius varies according to the amount of tape wound around said reel and which generates a fixed number of reel tach pulses per reel revolution, a reel motor which controls the speed of revolution of said reel in response to a reel motor voltage or current (voltage/current), and a spinnable capstan which controls the transport of tape across said capstan towards said reel and which generates a fixed number of capstan tach pulses per capstan revolution, said method comprising the steps of:

calculating a target count representing the expected number of capstan tach pulses per reel tach pulse based on the current tape stack radius and fixed capstan radius;

monitoring a received number of capstan tach pulses per received reel tach pulse at said current tape stack radius; and increasing said reel motor voltage/current if said received number of capstan tach pulse exceeds said target count.

2. The method of claim 1, comprising the step of:

decreasing said reel motor voltage/current if said received number of capstan tach pulses is equal to or below said target count.

3. The method of claim 2, wherein:

said reel motor voltage/current is not decreased below a nominal reel motor voltage/current when said tape is being transported towards said reel.

4. The method of claim 1, wherein:

said monitoring step comprises:

resetting a current capstan tach pulse count;

incrementing the current capstan tach pulse count once each time a capstan tach pulse is received;

comparing the target count value with the current capstan tach pulse count; and repeating said incrementing step through said comparing step if the current capstan count does not exceed the target count and a reel tach pulse is not received.

5. The method of claim 4, comprising the step of:

increasing the reel motor voltage/current by a predetermined increment for each occurrence that the current capstan tach pulse count exceeds the target count value.

6. A tape tension controller for preventing tape slack in a capstan controlled tape transport mechanism, said tape transport mechanism comprising a spinnable reel onto which tape is wound to generate a tape stack whose radius varies according to the amount of tape wound around said reel and which generates a fixed number of reel tach pulses per reel revolution, a reel motor which controls the speed of revolution of said reel in response to a reel motor voltage/current, and a spinnable capstan which controls the transport of tape across said capstan towards said reel and which generates a fixed number of capstan tach pulses per capstan revolution, comprising:

a phase detector which calculates a target count representing the expected number of capstan tach pulses per reel tach pulse based on the current tape stack radius, monitors a received number of capstan tach pulses per received reel tach pulse at said current tape stack radius; and a reel motor voltage/current adjustment circuit which is responsive to said phase detector monitoring to increase said reel motor voltage/current if said received number of capstan tach pulses exceeds said target count.

7. The tape tension controller of claim 6, wherein:

said phase detector comprises:

a target count calculator which calculates said target count;

a watchdog counter which maintains a watchdog count representing the number of capstan tach pulses generated by revolution of said capstan and which resets said watchdog count upon generation of a reel tach pulse; and a comparator which compares said watchdog count to said target count and generates a trigger signal when said watchdog count exceeds said target count.

8. The tape tension controller of claim 7, wherein:

said adjustment circuit comprises:

a voltage adjuster which increments a reel motor adjustment voltage upon receipt of said trigger signal; and an adder which adds said reel motor adjustment voltage to a nominal reel motor voltage/current to generate said reel motor voltage/current.

9. The tape tension controller of claim 8, wherein:

said voltage adjuster decrements said reel motor adjustment voltage if said trigger signal is not generated.

10. The tape tension controller of claim 9, wherein:

said voltage adjuster does not decrement below a predetermined minimum adjustment voltage.

11. The tape tension controller of claim 6, wherein:

a reel motor voltage/current adjustment circuit which is responsive to said phase detector monitoring to decrease said reel motor voltage/current if a reel tach pulse is received before said received number of capstan tach pulses exceeds said target count.

12. The tape tension controller of claim 11, wherein:

said reel motor voltage/current is not decreased below a predetermined nominal voltage when said tape is being transported towards said reel.

13. A capstan controlled tape transport mechanism, comprising:

a spinnable reel onto which a tape is wound to generate a tape stack whose radius varies according to the amount of the tape wound around said reel and which generates a fixed number of reel tach pulses per reel revolution;

a reel motor which controls the speed of revolution of said reel in response to a reel motor voltage/current;

a spinnable capstan which controls the transport of tape across said capstan towards said reel and which generates a fixed number of capstan tach pulses per capstan revolution; and a tape tension controller comprising:

a phase detector which calculates a target count representing the expected number of capstan tach pulses per reel tach pulse based on the current tape stack radius, monitors a received number of capstan tach pulses per received reel tach pulse at said current tape stack radius; and a reel motor voltage/current adjustment circuit which is responsive to said phase detector monitoring to increase said reel motor voltage/current if said received number of capstan tach pulses exceeds said target count.

14. The tape transport mechanism of claim 13, wherein: said phase detector comprises:
   a target count calculator which calculates said target count;
   a watchdog counter which maintains a watchdog count representing the number of capstan tach pulses generated by revolution of said capstan and which resets said watchdog count upon generation of a reel tach pulse; and
   a comparator which compares said watchdog count to said target count and generates a trigger signal when said watchdog count exceeds said target count.

15. The tape transport mechanism of claim 14, wherein: said adjustment circuit comprises:
   a voltage adjuster which increments a reel motor adjustment voltage upon receipt of said trigger signal; and
   an adder which adds said reel motor adjustment voltage to a nominal reel motor voltage/current to generate said reel motor voltage/current.

16. The tape transport mechanism of claim 15, wherein: said voltage adjuster decrements said reel motor adjustment voltage if said trigger signal is not generated.

17. The tape transport mechanism of claim 16, wherein: said voltage adjuster does not decrement below a predetermined minimum adjustment voltage.

18. The tape tension controller of claim 13, wherein:
   a reel motor voltage/current adjustment circuit which is responsive to said phase detector monitoring to decrease said reel motor voltage/current if a reel tach pulse is received before said received number of capstan tach pulses exceeds said target count.

19. The tape tension controller of claim 18, wherein: said reel motor voltage/current is not decreased below a predetermined nominal voltage when said tape is being transported towards said reel.

* * * * *